United States Patent [19]

Kobayashi et al.

[11] 3,954,434
[45] May 4, 1976

[54] METHOD OF MANUFACTURING A FERRITE MAGNETIC TRANSDUCER HEAD

[75] Inventors: Tomio Kobayashi; Kazuo Nozawa, both of Tagajo, Japan

[73] Assignee: Sony Corporation, Tokyo, Japan

[22] Filed: Feb. 14, 1975

[21] Appl. No.: 549,971

[30] Foreign Application Priority Data

Feb. 21, 1974 Japan.................................. 49-20716

[52] U.S. Cl. ........................................ 65/43; 65/45;
65/58; 29/603
[51] Int. Cl.² ............................................ C03B 23/20
[58] Field of Search ............... 65/43, 45, 58; 29/603

[56] References Cited
UNITED STATES PATENTS

| | | |
|---|---|---|
| 3,024,318 | 3/1962 | Duinker et al. .............................. 29/603 |
| 3,317,298 | 5/1967 | Klomp et al. .......................... 65/43 X |
| 3,375,575 | 4/1968 | Visser et al. .......................... 65/43 X |
| 3,494,026 | 2/1970 | Sugaya .................................. 65/58 X |
| 3,577,634 | 5/1971 | Secrist ...................................... 29/603 |

*Primary Examiner*—Arthur D. Kellogg
*Attorney, Agent, or Firm*—Hill, Gross, Simpson, Van Santen, Steadman, Chiara & Simpson

[57] ABSTRACT

A method of manufacturing a ferrite magnetic transducer head is disclosed, in which two Mn - Zn ferrite core blocks are bonded together with glass material containing $Fe_2O_3$ and $ZnO$. By proper thermal treatment, homogeneous dispersion of fine precipitates of Zn - Fe - O is formed in the bonding glass.

4 Claims, 16 Drawing Figures

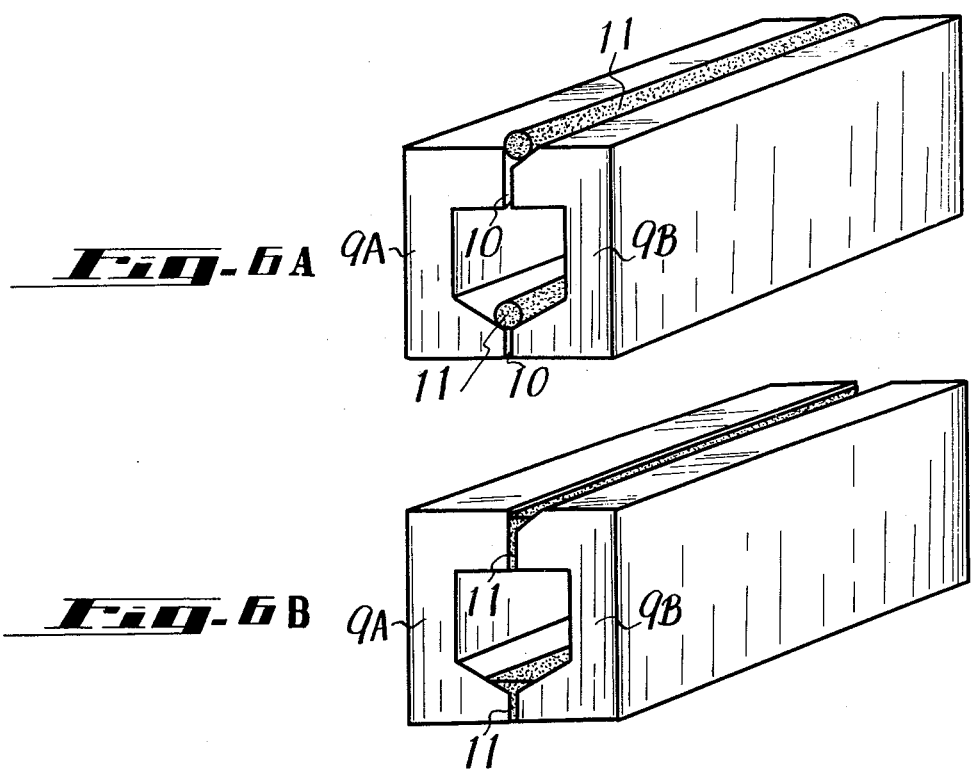
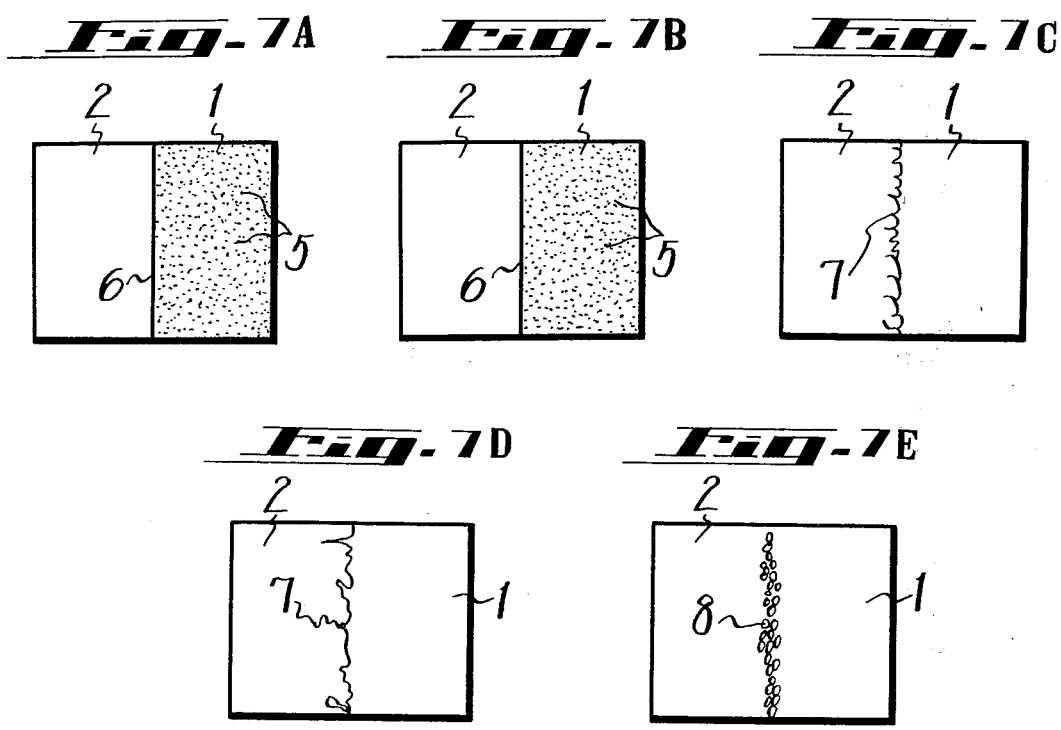

3,954,434

METHOD OF MANUFACTURING A FERRITE MAGNETIC TRANSDUCER HEAD

BACKGROUND OF THE INVENTION

1. Field of the Invention

This invention relates generally to a method of manufacturing a ferrite magnetic transducer head, and more particularly to a method of bonding two ferrite cores with glass material.

2. Description of the Prior Art

Recently, an oxide glass which is sufficient and stable in adhesive force and relatively low in melting point is widely used for a so-called gap melt bondage or injection of the effective gap of a ferrite magnetic head. This has the base that glass and ferrite are both oxides and mutual diffusion therebetween can be carried out sufficiently. However, this fact causes deteriorations in various characteristics in the surface layer of the ferrite which contacts with the glass. These deteriorations appear a great deal in a low melting point of glass whose components are modified oxides such as $Na_2O$, $PbO$, $ZnO$ or $Bi_2O_3$. That is, upon melt-bonding, the surface layer of ferrite is molten into glass or the glass erodes the surface layer of ferrite and, as shown in FIG. 1, a second phase 3 made of for example, $\alpha$ - $Fe_2O_3$ or other non-magnetic material is formed in the boundary between glass 1 and ferrite cores 2. The formation of such phase 3 results in distortion of the shape of ferrite cores 2 which makes it impossible to manufacture ferrite parts of a predetermined design and also deteriorates the magnetic characteristics of the ferrite in its surface layer. That is, its permeability is lowered and its maximum magnetic flux density is also lowered, which is a serious deterioration of ferrite as a magnetic material. Since property of thermal expansion is different in ferrite and glass, when the ferrite is melt-bonded with glass, cracks may appear in the ferrite and the glass due to their shrinkage-distortions upon cooling.

FIG. 2 is a graph showing the thermal expansion characteristics of the glass and ferrite in which a curve I shows the characteristic of $SiO_2$ - $Na_2O$-$B_2O_3$ system glass and a curve II that of Mn-Zn ferrite. The distortion caused by the difference of the thermal expansion characteristics between the glass and ferrite may increase when the amount of used glass increases. As a result, cracks also increase to lower a great deal the yield of ferrite parts. Even in the case where no cracks are present, a residual strain or distortion is given in the ferrite which may deteriorate the magnetic characteristics of ferrite such as permeability, maximum magnetic flux density and so on.

An oxide glass having a relatively low melting point which is lower than ferrite in hardness, so that when ferrite cores 2A and 2B are melt-bonded with an oxide glass 1 of relatively low melting point to make a ferrite magnetic head 4, the glass 1 is first abraded to form a concave 1a when a magnetic tape (not shown) travels in contact with the head 4 as shown in FIG. 3. In this case, magnetic powders torn from the magnetic tape may be stored in the concave 1a, which is undesirable.

In order to avoid the above defects, by way of example, there is proposed in U.S. Pat. No. 3,188,400 that the ferrite head cores be melt-bonded at the temperature of 1000°C–1250°C with sintering glass containing particles which are the same as those forming the ferrite cores to form a transition layer such as ferrite solid-solution between the head cores and the glass, which transition layer improves the bonding between the head cores and glass. This method can improve the bonding between the ferrite cores, but since the transition layer is formed between the ferrite cores and glass, its effective gap becomes different from that determined initially by a spacer. Further, the ferrite is eroded by the glass from a microscopic point of view.

SUMMARY OF THE INVENTION

It is an object of this invention to provide an improved method of manufacturing a ferrite magnetic transducer head.

It is another object of the invention to provide an improved method of bonding ferrite cores with glass.

It is a further object of the invention to provide a method of bonding ferrite cores with glass in which homogeneous fine Fe - Zn - O crystalline phase is formed.

It is a still further object of the invention to provide a method of manufacturing a ferrite magnetic transducer head using a special glass which does not react with the surface layer of ferrite cores and is high in hardness in which distortion caused by the differences of thermal expansion between the ferrite and glass is scattered.

The other objects, features and advantages of the invention will become apparent from the following description taken in conjunction with the accompanying drawings.

BRIEF DESCRIPTION OF THE DRAWINGS

FIGS. 6A and 6B are schematic diagrams showing steps of bonding ferrite cores with glass of the present invention;

FIGS. 7A to 7E, inclusive, are schematic diagrams showing the melt-bonded states of glasses of different compositions to ferrites, respectively;

DESCRIPTION OF THE PREFERRED EMBODIMENT

Figure 1:
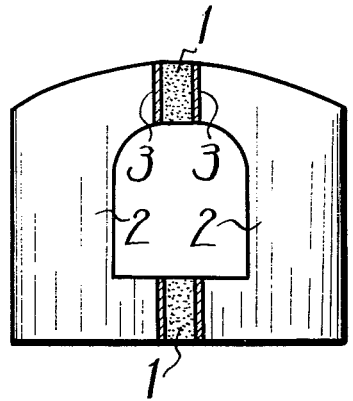
FIG. 1 is a front view of a prior art ferrite magnetic core.
Figure 2:
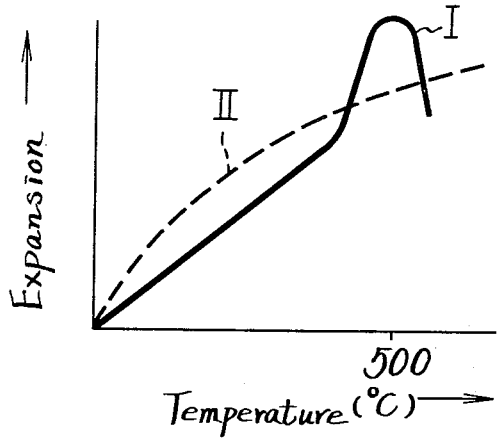
FIG. 2 is a graph showing the thermal expansion characteristics of ferrite and glass.
Figure 3:
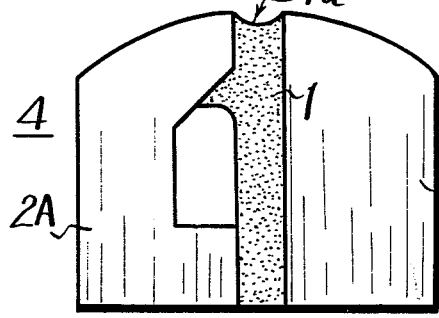
FIG. 3 is a front view of a prior art ferrite magnetic core.

A method of manufacturing a ferrite magnetic transducer head according to this invention will be now described with reference to the drawings.

In the invention, glass material whose main component is $SiO_2$ system, $B_2O_3$ system or $PbO$ system and which contains 7–30 weight percents of $Fe_2O_3$ and 3–25 weight percents of $ZnO$ is charged in molten state into a gap between two ferrite cores and is cooled at a speed lower than 300°C/hour. By adding $Fe_2O_3$ and $ZnO$ at the same time to the glass material, fine precipitates of Fe - Zn - O system crystal can be precipitated in the glass base homogeneously to greatly increase the hardness of the glass and to eliminate any erosion or reaction between the glass and ferrite and also to scatter strain or distortion stored or integrated upon melt-bonding of ferrite and glass by fine and homogeneous precipitates of Fe - Zn - O system crystalline phase. In this case, it is preferred that $Fe_2O_3$ is added to the glass material more than ZnO. When the adding amount of $Fe_2O_3$ is lower than 7 weight percents or that of ZnO is lower than 3 weight percents, $Fe_2O_3$ and ZnO are solid-dissolved in the glass and hence no precipitation of Fe - Zn - O system crystalline phase appears in the glass. As a result, when the ferrite is melt-bonded with the glass, the surface layer of ferrite is eroded or $\alpha$ - $Fe_2O_3$ is deposited in the boundary between the glass and ferrite. Further, when the adding amount of $Fe_2O_3$ is more than 30 weight percents or that of ZnO is more than 25 weight percents, deposited particles of Fe - Zn - O system crystalline phase are rough and great and their amount is too great, so that the viscosity of the glass becomes great and hence the flow of glass upon melt-bonding is much low which will mean that such glass can not be used for melt-bondage. Further, the reason why the cooling speed is selected lower than 300°C/hour is that if the cooling speed is selected higher than the above speed, the Fe - Zn - O system crystalline is not educed.

Next, the invention will be now described with reference to examples of the present invention.

EXAMPLE I

The following table I shows various compositions of glasses whose adding amounts of glass components $SiO_2$, $Na_2O$, PbO, $B_2O_3$, $Fe_2O_3$ and ZnO are different. In the table I, specimen numbers 1 to 5 represent glasses according to the invention, while specimen numbers 6 to 11 represent glasses other than those of the invention for the sake of comparison.

Table I

| | Specimen No. | Glass composition (Weight percent) | | | | | |
|---|---|---|---|---|---|---|---|
| | | $SiO_2$ | $Na_2O$ | PbO | $B_2O_3$ | $Fe_2O_3$ | ZnO |
| Glass of Invention | 1 | 15.0 | 8.0 | 32.0 | 30.0 | 10.0 | 5.0 |
| | 2 | 30.0 | 15.0 | 20.0 | 20.0 | 10.0 | 5.0 |
| | 3 | 13.6 | 10.0 | 12.7 | 17.3 | 25.5 | 20.9 |
| | 4 | 3.2 | 3.2 | 27.2 | 20.0 | 25.5 | 20.9 |
| | 5 | 3.2 | 9.5 | 28.7 | 9.5 | 19.0 | 14.3 |
| Glass for Comparison | 6 | 16.0 | 9.0 | 33.0 | 31.0 | 10.0 | 1.0 |
| | 7 | 17.0 | 9.0 | 34.0 | 31.0 | 4.0 | 5.0 |
| | 8 | 13.6 | 10.0 | 13.6 | 12.7 | 25.5 | 24.6 |
| | 9 | 13.6 | 10.0 | 13.6 | 12.7 | 29.2 | 20.9 |
| | 10 | 30.0 | 20.0 | 25.0 | 25.0 | — | — |
| | 11 | 10.0 | 10.0 | 40.0 | 40.0 | — | — |

Figure 8:
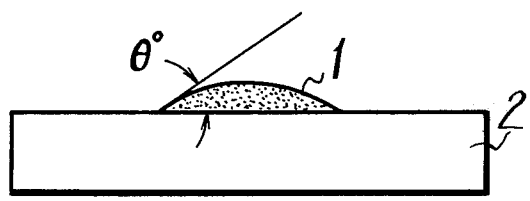
FIG. 8 is a schematic diagram showing a manner to measure the wet contact angle of glass to ferrite.

The glasses with the composition in the above table I is molten at 1300°C and formed as a rod with the diameter of 1 mm. Then, the glasses 1 are located on a ferrite 2 which has the composition of 55 mole percents of $Fe_2O_3$, 20 mole percents of ZnO and 25 mole percents of MnO and which is subjected to a mirror finishing process as shown in FIG. 8 and they are subjected to a heating or thermal treatment in the atmosphere of $N_2$ along a curve $a$ in FIG. 4 (at the cooling speed of 160°C/hour). FIGS. 7A to 7E show the states of the boundaries between the ferrite 2 and the glass 1 at this time and a wet contact angle $\theta$ of the ferrite 2 with the glass 1 is shown in the following table II. The rods formed of the above mentioned composition of glasses are softened at 620–670°C.

Table II

| | Glasses of Invention | | | | | Glasses for Comparison | |
|---|---|---|---|---|---|---|---|
| Specimen No. | 1 | 2 | 3 | 4 | 5 | 8 | 9 |
| Wet contact angle ($\theta°$) | 13° | 14° | 16° | 13° | 14° | 25° | 28° |

FIGS. 7A, 7B, 7C, 7D, and 7E are the cases using the glasses of specimen No. 1, 2, 6, 7 and 11, respectively. As may be apparent from FIGS. 7A and 7B, with the glasses 1 and 2 of this invention, fine and homogeneous particles 5 of Fe - Zn - O system crystalline phase are precipitated in the glasses 1, the ferrite 2 is not eroded in its surface layer and no second phase such as $\alpha$ - $Fe_2O_3$ is educed in the boundary 6. Further, as may be apparent from FIGS. 7C and 7D, with the Glasses of the specimen Nos. 6 and 7, Fe - Zn - O system crystalline phase is not precipitated in the glasses 1 and the glasses 1 erode the surface of the ferrite 2 as shown by 7. As may be seen in FIG. 7E, with the glass of the specimen No. 11, a second phase 8 such as $\alpha$ - $Fe_2O_3$ is formed in the surface layer of the ferrite 2.

In the case where the glasses of the invention or the glasses of the specimen Nos. 3, 4 and 5 are used, the states of the melt-bondages are substantially same as those of the specimen Nos. 1 and 2. Accordingly, the adding amount of $Fe_2O_3$ must be greater than 7 weight percents and that of ZnO must be greater than 3 weight percents.

While, as may be apparent from the table II, the wet contact angle $\theta$ of the glasses of the specimen Nos. 1, 2, 3, 4 and 5 is small, such as 13°–16°, which will mean that the glasses of the invention contact with the ferrite sufficiently and are suitable as glass for melt-bondage. On the other hands, the wet contact angle of the glasses of the specimen Nos. 8 and 9 are much great as 25°–28° which will mean that the contact of the glasses with the ferrite is much poor and the glasses are undesirable as glass for the melt-bondage.

Generally, upon manufacturing of a magnetic head, as shown in FIGS. 6A and 6B, two ferrite cores 9A and 9B each being U-shaped in cross-section are opposed with a predetermined gap 10 through a spacer (not shown), then externally clamped by a jig (not shown), glass rods 11 for the melt-bondage are disposed on predetermined positions, and then the glass rods 11 are heated to melt the same and to flow the molten glass into the gaps 10. Thus, the ferrite cores 9A and 9B are melt-bonded with the glass.

As may be apparent from the foregoing, the flowing of the molten glass and its wet contact with the ferrite are important in the melt-bonding of the ferrite cores. That is, if the wet contact of the molten glass with the ferrite is bad, the accurate melt-bondage of parts can not be achieved. Even if glass is inferior in wet contact, by increasing its heating temperature its wet contact can be increased. However, if the temperature for melt-bonding the ferrite cores is selected more than 850°C, a jig (made of heat resistance alloy) for the ferrite cores upon melt-bonding is softened to deteriorate the accuracy of products. Accordingly, the upper limit of the melt-bonding temperature is limited to 850°C, the containing amount of $Fe_2O_3$ must be selected lower than 30 weight percents and that of ZnO is selected lower than 25 weight percents.

After various experiments are carried out by changing compositions on the adding amounts of $SiO_2$, NaO, PbO and $B_2O_3$, it is ascertained that the precipitation of Fe - Zn - O system crystalline phase is not affected thereby. However, if the adding amount of $SiO_2$ is too small, the glass base surrounding precipitated crystalline is lowered in hardness, as is well known. Therefore, $SiO_2$ must be contained to some extent. Further, $Na_2O$ and PbO are preferred to lower the melting point of the glass. $B_2O_3$ is low in melting point but relatively high in hardness so that it is preferred as component of glass with a low melting point.

EXAMPLE II

The hardnesses of the glasses shown in the table I, which is measured by the Knoop hardness testing-machine, are shown in the following table III.

Table III

| Specimen No. | Glass of Invention | | | | | Glass for Comparison | | | |
|---|---|---|---|---|---|---|---|---|---|
| | 1 | 2 | 3 | 4 | 5 | 6 | 7 | 10 | 11 |
| Knoop Hardness | 460 | 470 | 490 | 480 | 490 | 390 | 395 | 390 | 360 |

As may be seen in the above table III, the glasses of the invention with the specimen Nos. 1, 2, 3, 4 and 5 in which Fe - Zn - O system crystalline phase is educed as fine and homogeneous particles have high hardnesses as compared with the other glasses with the specimen Nos. 6, 7, 10 and 11.

EXAMPLE III

Figure 4:
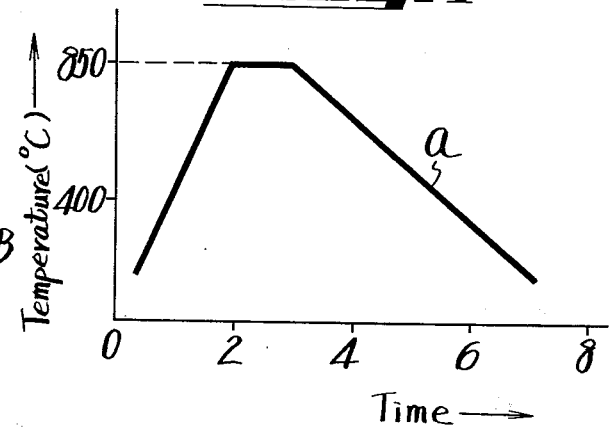
FIGS. 4 and 5 are graphs showing thermal treating conditions used for explaining this invention, respectively.
Figure 9A:
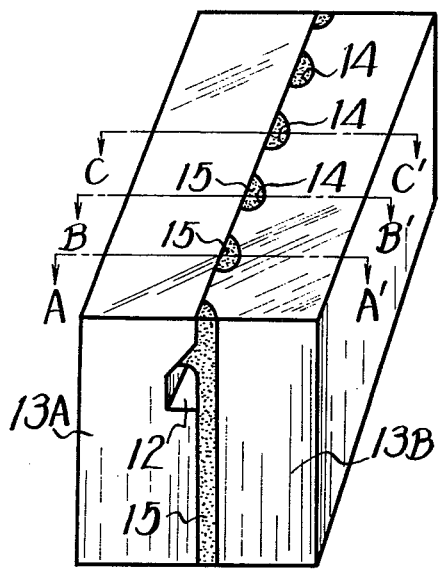
FIGS. 9A and 9B are persepctive views showing steps of making a video head which is used as an example of the present invention.
Figure 9B:
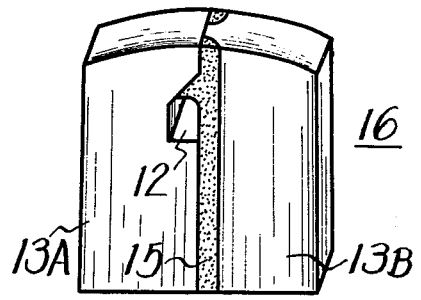

The glasses of the specimen Nos. 1, 2, 3, 4 and 5 of the invention are used for melt-bonding ferrite video cores 13A and 13B shown in FIGS. 9A and 9B under the heating treatment condition (at cooling speed of 160°C/hour) shown in FIG. 4. In the examples of FIGS. 9A and 9B, the ferrite core 13A which has a bore 12 for windings and the ferrite core 13B which has grooves 14 on the surface contacting with the core 13A at a predetermined distance for restricting a track width are melt-bonded by a glass 15, and then the bonded cores 13A and 13B are cut along the center of each groove 14 (refer to lines A-A', B-B' and C-C' in FIG. 9A) to make a head 16 (FIG. 9B). As a result of the above, no crack is produced at the core portion and glass portion of each of the specimens 1 to 5 of the invention.

Figure 10:
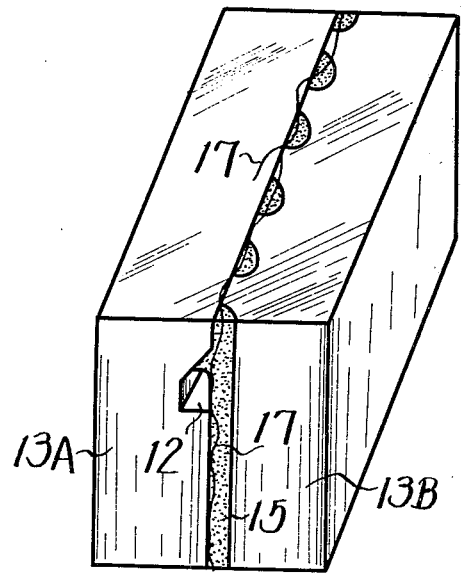
FIG. 10 is a perspective view showing the state of a video head which is used as an example of the present invention.

On the other hands, the similar melt-bondings have been carried out with using the glasses of the specimen Nos. 6, 7, 10 and 11 and under the similar heating treatment condition. As a result of this, cracks 17 were produced by 30 percent as shown in FIG. 10.

Figure 5:
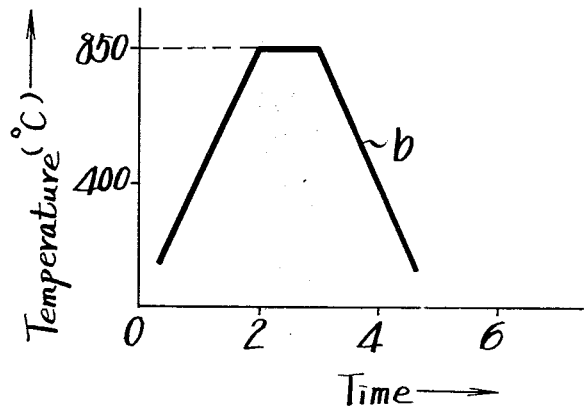

The cores shown in FIG. 9A are melt-bonded with the glasses of the specimen Nos. 1, 2, 3, 4 and 5 of the invention under the heating treatment condition shown by a curve $b$ in FIG. 5 (at cooling speed of 400°C/hour). In this case, the cracks 17 shown in FIG. 10 are produced at the rate of 30 percent. At this time, when the glass composition is observed by a microscope, fine particles of Fe - Zn - O system crystalline phase are not educed. That is, when the cooling speed during the melt-bonding is higher than 300°C/hour, before fine particles are educed, the atoms forming the glass are stopped in their diffusion. Thus, the glass remains transparent. At this time, the hardness of the glass is low and residual distortions stored or integrated during the melt-bonding can not be scattered which results in cracks. Therefore, with this invention, the cooling speed after the glass being charged into the gap between ferrite cores must be selected lower than 300°C/hour.

EXAMPLE IV

The ferrite cores are melt-bonded with the glasses of the specimen Nos. 2, 3, and 11 shown in the table I under the heating treatment condition (at the cooling speed of 160°C/hour) shown in FIG. 4 to make the ferrite video head with the gap length of about 1 μm such as shown in FIG. 9B and an output from the head is measured by using a $CrO_2$ tape. As a result, it is noted that the output from the head which is made by using the glasses of the specimen Nos. 2 and 3 is greater than that from the head which is made by using the glass of the specimen No. 11 by 1 dB at 1 MHz.

As described above, with the present invention in the case where the ferrite cores are melt-bonded with the glass, the ferrite cores are not eroded by the glass and the second phase such as $\alpha$ - $Fe_2O_3$ is prevented from being educed in the boundary between the glass and ferrite to avoid the lowering of magnetic characteristics of the ferrite. Further, the residual distortions, which may be stored or integrated during the melt-bonding due to the difference of thermal expansion between the ferrite and glass, can be scattered to entirely eliminate the formation of cracks. In addition, since the glass of the invention has much high hardness as compared with the prior art glass, the glass of the invention is preferred for used with the melt-bonding of the magentic head cores from an abrasion point of view by the tape travelling thereon. Further, the yeild of magnetic heads in much improved with improved magnetic characteristics.

It will be apparent that many modifications and variations could be effected by one skilled in the art without departing from the spirits or scope of the novel concepts of the present invention.

We claim:
1. A method of manufacturing a ferrite magnetic transducer head comprising the steps of:
    a. placing two Mn - Zn ferrite core blocks spaced apart with respect to each other to form an effective gap;
    b. placing glass material containing $Fe_2O_3$ between 7 and 30 weight percents and ZnO between 3 and 25 weight percents (of the total weight of said glass);
    c. melting said glass and flowing the same into said gap between said two ferrite cores; and
    d. cooling said cores at a rate to form homogeneous dispersion of fine precipitates of Zn - Fe - O in said glass.

2. A method of manufacturing a ferrite magnetic transducer head as claimed in claim 1, wherein said glass also contains one or more of $SiO_2$, $Na_2O$, PbO and $B_2O_3$.

3. A method of manufacturing a ferrite magnetic transducer head as claimed in claim 1, wherein said glass contains more $Fe_2O_3$ than ZnO.

4. A method of manufacturing a ferrite magnetic transducer head as claimed in claim 1, wherein said ferrite cores having a gap filled with the molten glass is cooled at a cooling rate lower than 300° centigrade per hour.

* * * * *